March 20, 1962 R. B. MARKS 3,026,453
ADJUSTABLE THREE DIMENSIONAL CIRCUIT SYSTEM
Filed April 7, 1959
FIG. 1
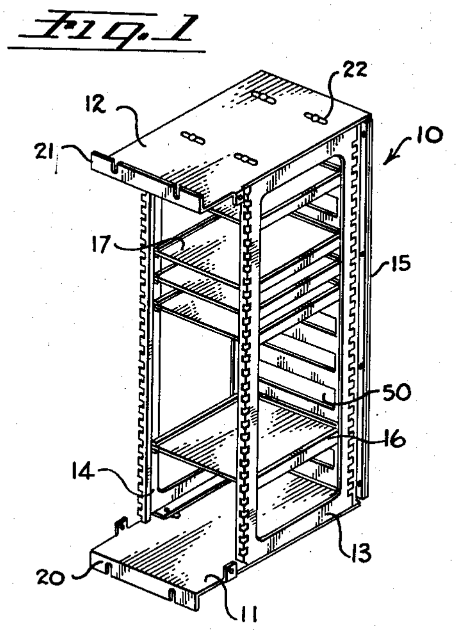
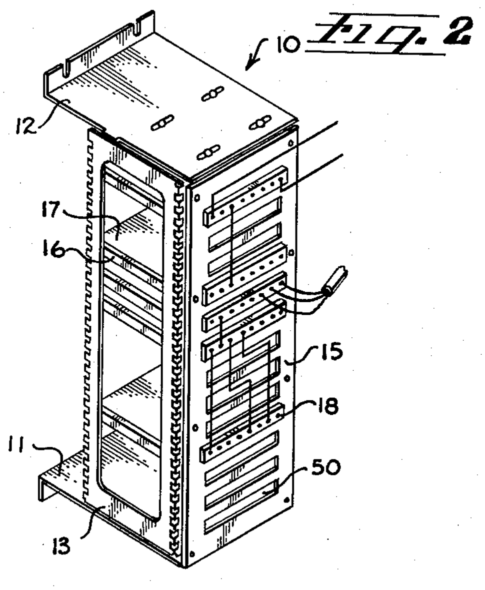
FIG. 2
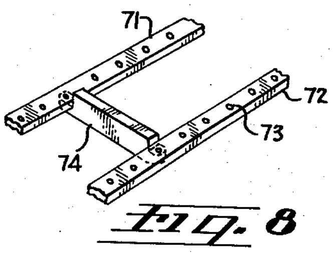
FIG. 8
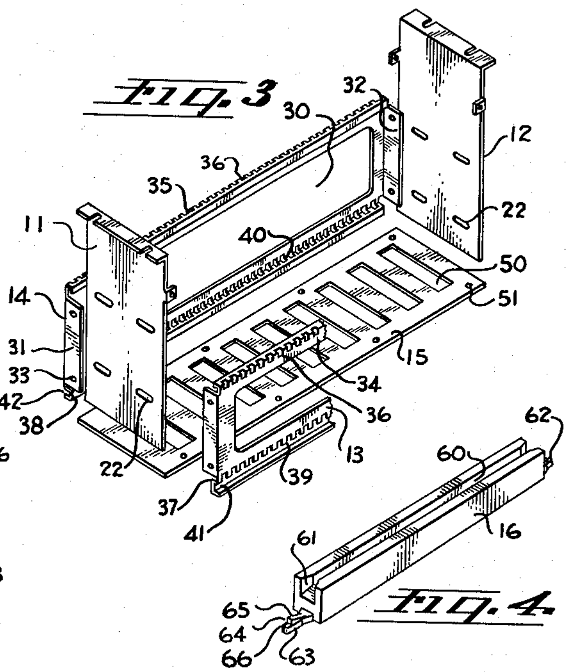
FIG. 3, FIG. 4
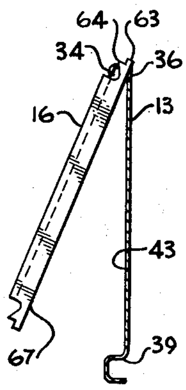
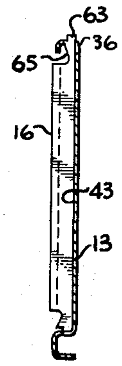
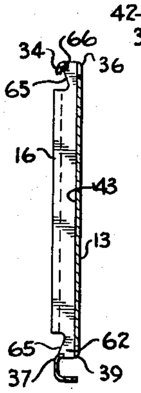
FIG. 5 FIG. 6 FIG. 7
INVENTOR.
ROBERT B. MARKS
BY
Beehler & Shanahan
ATTORNEYS

1

3,026,453

ADJUSTABLE THREE DIMENSIONAL CIRCUIT SYSTEM

Robert B. Marks, 9721 Horner St., Los Angeles, Calif.

Filed Apr. 7, 1959, Ser. No. 804,781
6 Claims. (Cl. 317—101)

This invention relates generally to frames for removably mounting a plurality of circuit cards, and more particularly, to a circuit card frame in which the side panels carry slotted retainer bars at their front and back edges, and circuit card holders are mountable on the inner surfaces of said side panels by means of flexible mounting studs at each end of each of said holders, which studs resiliently snap into position in said mounting slots in said retainer bars.

As the role of electricity in science and engineering has extended far beyond the fields of power and into many complex operations collectively referred to as data processing, circuits have become extremely complex and extensive, and improved components have become smaller and smaller so that major circuit components can now be mounted entirely on a so-called circuit card, usually a stiff panel of insulating material a few inches in height and width and less than one-sixteenth of an inch in thickness. Usually, such circuit cards have printed or etched circuitry, and one edge, referred to as the back edge in this specification and claims, is provided with a number of terminal connections. Each terminal connection may include a backwardly extending pin, or male connection member, which is received in a connector bar, which mates with the back edge of the circuit card, and to which external wiring is soldered. Thus, a circuit card can readily be pulled from connection with a connector bar, and replaced with another circuit card having the same terminal connections, but a different circuit; or a defective circuit card may be replaced by a perfect one, without any soldering or other time-consuming circuit connection changes.

In the giant computers, which both military and industrial application of electronic data processing have caused to be developed, several of such circuit cards are conveniently mounted in some type of a structure, variously referred to as a "cage," "box," "support," or "rack." This specification and claims will refer to such a structure as a "circuit card frame."

Metal would be by far the cheapest and most convenient material for a circuit card frame, but in the past almost all circuit card frames have been constructed of plastic moldings, since it is important to mount the circuit cards themselves in plastic rather than metal holders.

Recently, it has been recognized that great savings in fabrication, and a much lighter frame could be produced by mounting slotted plastic holders in a frame stamped from sheet metal. Unfortunately, although lightness was thus achieved, the savings in costs was not significant with designs heretofore known, because each size of circuit card called for the separate fabrication of a different cage size, and every cage required a large number of plastic holders along each side panel, each of them permanently in place, and spaced from each other a distance which was too great, in some cases, and too little in others.

In many instances, it was desired to mount bulky components on a circuit card, and also to have access to the circuit cards through the side panels. The card cages in which the side panels were completely filled with permanently in place card holders prevented the most efficient use of spacing between cards, and practically barred access through the side panels.

Moreover, the flexibility of the circuit card frame could be greatly increased if all the plastic holders were removable and replaceable at will. Thus, holders could be positioned in a frame as required by an experimental circuit; after the circuit was no longer of interest, the frame could be returned to stock, where all the previously used card holders would be removed, and the frame reissued to a new user, who would be free to place only those card holders that he required at exactly the positions in which he required them.

2

The present invention overcomes the foregoing and many other objections, and achieves all the above and other objects.

Moreover, the side panels of the present circuit card frame are readily formed by ordinary steel stamping methods, and the plastic circuit card holders are snapped into position in the side panels of the present invention in a manner which holds them under a slight tension, not great enough to subject them to breakage, but sufficient to prevent rattling or looseness.

The manner in which all the advantages of the present invention are achieved may be understood from the following description of one specific embodiment, taken in connection with the accompanying drawings, in which:

FIGURE 1 is a front perspective view of a circuit card frame constructed according to the invention, showing five circuit cards disposed in the frame and spaced from one another in an irregular manner;

FIGURE 2 is a back perspective view of the circuit card frame of FIGURE 1, showing connections made through connection bars in the back of the frame;

FIGURE 3 shows the circuit card frame of FIGURES 1 and 2 exploded into disassembly, one side panel being fragmentarily removed to reveal the back panel;

FIGURE 4 is a perspective view of one of the plastic circuit card holders;

FIGURES 5, 6 and 7 are transverse sectional views through a side panel showing the various steps by means of which the holder of FIGURE 4 is inserted into mounting position in the side panel; and FIGURE 8 shows an alternative form of back mounting for a terminal or connection bar.

In FIGURE 1, a circuit card holder indicated generally by the arrow 10 is seen to be comprised of a pair of end panels 11 and 12, a pair of side panels 13 and 14, a back panel 15, and several pairs of circuit card holders 16. The circuit cards themselves are indicated by the numeral 17. It will be understood that any type of circuit card may be used, and that this invention relates not to the card but to the frame in which it may be supported.

Also, the terminal bars, or connection bars, 18, seen on the back surface of the back panel 15 in FIGURE 2, comprise no part of the present invention, since they are manufactured and sold in many standard types, any of which may be accommodated in a properly constructed frame of the present invention.

It will be seen that the end panels 11 and 12 are provided, respectively, with mounting flanges 20 and 21 by means of which they may be bolted or otherwise fastened to the framework or paneling of a large circuit housing structure.

Also, it will be noted from the views of FIGURES 1, 2 and 3, that the end panels 11 and 12 are provided, near each side edge, with a pair of lateral slots 22, which permit laterally adjustable mounting of side panels 13 and 14, as will be described hereinafter.

Side panels 13 and 14 have their entire center portions removed as indicated at 30 in FIGURE 3, both to lighten the frame 10 and to provide side access to circuit cards mounted in the frame. However, the presence or absence of the central portions of the side panels 13 and 14, which would occupy the space 30 if the panels were solid, is of no importance to the operation of the invention's novel assembly of holders 16 to side panels 13 and 14. Each of the side panels 13 and 14 is provided with similar end flanges for mounting to end panels 11 and 12, as exemplified, in FIGURE 3, by panel 14 which has end flanges 31 and 32, each of which is provided with bolt holes 33 for adjustable bolted attachment through the lateral end panel slots 22.

The front edges 34 and 35 of side panels 13 and 14, respectively, are bent inwardly relative to the frame 10 to form channels of rectangular-U cross-section opening toward the back of the frame 10. At the outer and forward corners of the front channel edges 34 and 35, there are a series of 90° slots 36, spaced from each other only slightly more than the width of one of the holders 16.

The back edges of the side panels 13 and 14 are flanged inwardly by means of flanges 37 and 38 on side panels 13 and 14, respectively, the outer back corners of flanges 37 and 38 being provided with a plurality of spaced slots 39 and 40 confronting and corresponding to the spaced slots 36 in the associated front edge channels 34 and 35.

Preferably, but not necessarily in all forms of the invention, the back flanges 37 and 38 may extend backwardly and outwardly to form outwardly opening channels 41 and 42, which serve to stiffen the back edges of the side panels, and to provide a convenient mounting means for the back panel 15.

Back panel 15 is provided with a number of transverse openings 50 which conveniently receive the terminal bars 18. The back panel 15 bolts to the back edge of the channels 41 and 42 by bolts inserted through bolt holes 51.

The purpose of the front edged channels 34 and 35, together with their slots 36, and the back edge flanges 37 and 38, together with their slots 39 and 40, is to provide a novel insertion and retaining means for mounting the holders 16 against the inner or mounting surface of the side panels 13 and 14, as will be described in subsequent paragraphs.

FIGURE 4 reveals that the holder 16 is provided with a longitudinal card slot 60 for closely receiving the edge of one of the circuit cards 17. Preferably, the ends of the slot 60 are divergent to a larger opening as indicated at 61 in order to make card insertion convenient. The holder 16 is molded of some convenient and inexpensive plastic which provides some insulation from the stamped metal panels comprising the rest of the frame 10.

The holders 16 are held in position against the inner mounting surfaces of the two side panels 13 and 14, in the positions shown in FIGURES 1 and 2, by means of small insert studs 62 and 63, which extend longitudinally from each end of the holder 16, at the back thereof, so as to be near the mounting surface of the side panel.

It will be seen that the mounting stud 63 is made somewhat flexible in the plane of the slot 60 by being formed with a thickness substantially less than its width. This flexibility is an essential feature of the invention to permit resilient snapping of the holder 16 into position in one of the side panels, and to hold it tightly in position once placed. Finally, it serves the additional function of being readily fracturable under hand pressure when it is decided to break out the holder 16 and replace it with a new holder in the same or a different position.

It will be seen that the side of the insert stud 63 which faces toward the interior of the frame 10 is provided with a wedge-shaped structure 64, which presents an inclined plane surface 65, and, at the end of the surface 65, provides a shoulder 66. The role of these parts will best be understood from a consideration of the method of inserting and holding holder 16, as described in connection with FIGURES 5, 6 and 7 in the following paragraphs.

In FIGURE 5, one sees a transverse section of right side panel 13, taken through a front slot 36 and a back slot 39. The holder 16 is in the initial stage of insertion, being tilted so that the entire upper edge of the insert stud 63, including the wedge-shaped boss or projection 64, is received through the slot 36. Note that the channel 34 mates with the length of the insert stud 63 beyond the main portion of the holder 16 so as to permit insertion to the proper depth.

Next, as seen in FIGURE 6, the holder 16 is swung downwardly until its back surface 67 is flush with the mounting surface 43 (i.e. the inner surface) of side panel 13. Although it is not visible on the scale of the drawing, the insert stud 63 is necessarily flexed backwards a slight amount at this stage of the operation.

As seen in FIGURE 7, the holder 16 is next shifted vertically downwardly against mounting surface 43 so as to bring the lower insert stud 62 into position in the back slot 39. The inclined surface 65 causes a certain amount of outwardly resilient flexing of the insert stud 63 as the downward movement is carried out, but when the longitudinal positioning shoulder 67 on the back insert stud 62 is seated against the back flange 37, the shoulder 66 on the front insert stud 63 will snap into position against the inside of the channel 34.

It will be appreciated, that the invention is not limited to the precise structure illustrated in the specific embodiment, but comprehends all the alternative forms which might be constructed within the scope of the appended claims. For example, it is not absolutely necessary that the front edges of the side panels 13 and 14 be bent over into re-entrant parts so as to form full channels 34 and 35. All that is necessary is that there be supported inwardly of the mounting surface 43, and slightly to the front of the upper contacting edge thereof, a retainer bar of some kind, in the illustrated case, the inner part of the channels 34 and 35. Of course, this channel must be slotted to receive the insert studs 63 to prevent sidewise movement of the holders 16, but the retainer bars and their slots can be supported in any suitable manner spaced inwardly from the mounting surface 43. Similarly, at the back edges of the panels 13 and 14, it is seen that the inner edges of the flanges 37 and 38 form back retainer bars, which also have their slots 39 and 40, but it will be understood that the back panel mounting channels 41 and 42 are extras, and not required in all forms of the invention, and also, that the retainer bar feature might be accomplished by other structures, so long as the inward displacement and backward spacing of the retainer bar and retainer bar slot feature were properly related to the mounting surface 43 on the inside of the side panels.

The invention is not limited by any means to the particular structure illustrated for back panels in FIGURES 1, 2 and 3. For example, the back panel might be comprised simply of two strips 71 and 72, as illustrated in FIGURE 8, which would be bolted along the back edges of side panels 13 and 14, and would be provided with bolt holes 73 by means of which terminal bars 74 could be attached at various points.

I claim:

1. A frame for supporting circuit cards which includes: a hollow structure including a pair of side panels opposite each other; a plurality of circuit card holders adapted to be mounted in opposing pairs on the inner surfaces of said side panels, each of said holders having an inner face constructed to receive the edge of a circuit card disposed in said circuit card frame between said side panels; a resiliently flexible mounting stud extending from each end of each of said circuit card holders; a front retainer structure extending along the front edge of each of said side panels, supported inboard of the mounting surface of said side panels, and provided with mounting slots opening toward said mounting surface, and adapted to receive said mounting studs; a back retainer structure along the back edge of each of said side panels, and supported inward of said side panel mounting surface, and provided with mouting slots opening toward said side panel mounting surface and oppositely matching the mounting slots in the front retainer bar of the same side panel to support a holder in said slots with its card slot in position for receiving a circuit card in said frame.

2. A frame for supporting circuit cards which includes: a rectangular box structure comprised of a pair of end panels and a pair of side panels assembled together, said box structure having a front opening for insertion of said circuit cards parallel with said end panels and normal to said side panels, and a back opening for terminal connection to said circuit cards; a plurality of circuit card holders formed of insulating material and adapted to be mounted in opposing pairs on the inner surfaces of said side panels, each of said holders being slotted to receive the edge of a circuit card mounted in said circuit card frame between said side panels; a front retainer bar extending along the front edge of each of said side panels, supported inboard of the mounting surface of said side panels, and provided with mounting slots opening toward said mounting surface; a back retainer bar along the back edge of each of said side panels and supported inward of said side panel mounting surface, and provided with mounting slots opening toward said side panel mounting surface and oppositely matching the mounting slots in the front retainer bar of the same side panel, to support a holder in said slots with its card slot in position for receiving a circuit card in said frame; and a resiliently flexible mounting stud extending from each end of each of said circuit card holders, and received in said retainer bar slots, each of said mounting studs being provided with a shoulder extending inwardly of said stud near the end thereof, and adapted to seat against the adjacent retainer bar.

3. A frame for supporting circuit cards which includes: a rectangular box structure comprised of a pair of end panels and a pair of side panels assembled together, said box structure having a front opening for insertion of said circuit cards parallel with said end panels and normal to said side panels, and a back opening for terminal connection to said circuit cards; a plurality of circuit card holders formed of insulating material and adapted to be mounted in opposing pairs on the inner surfaces of said side panels, each of said holders being slotted to receive the edge of a circuit card mounted in said circuit card frame between said side panels; a resiliently flexible mounting stud extending from each end of each of said circuit card holders, each of said mounting studs being provided with an inclined plane cam structure extending inwardly of said frame toward the end of said insert and terminating in a longitudinally positioning shoulder just short of the end of said mounting stud; a front retainer bar extending along the front edge of each of said side panels, supported inboard of the mounting surface of said side panels, and provided with mounting slots opening toward said mounting surface, and adapted to receive said mounting studs and engage said shoulders thereon; a back retainer bar along the back edge of each of said side panels, and supported inward of said panel mounting surface, and provided with mounting slots opening toward said side panel mounting surface and oppositely matching the mounting slots in the front retainer bar of the same side panel to support a holder in said slots with its card slot in position for receiving a circuit card in said frame; and terminal block mounting means at the back of said frame corresponding to each opposing pair of said circuit card holders, and adapted to provide connection for a circuit card mounted in said pair of card holders.

4. A frame for supporting circuit cards having back terminal edges for connection to terminal bars, which frame includes: a rectangular frame structure including a pair of end panels; a pair of side panels, and a back panel having at least one opening for terminal bars; an inwardly extending mounting flange formed along the front edge of each of said side panels, the corner of said flange and side panel being provided with a plurality of spaced mounting slots; an inwardly extending mounting flange along the back edge of each of said side panels, the corner of said flange and said side panel being provided with a plurality of spaced mounting slots corresponding to said slots in said front edge channels; a plurality of circuit card holders formed of insulating material adapted to be mounted against the inner mounting surface of said side panels, extending from front to back thereof, and slotted on the inner side to receive the edge of a circuit card; a mounting stud extending longitudinally from each end of each of said holders and adapted to be received in said mounting slots, each of said mounting studs being resiliently flexible at the base to permit flexure of said stud in a plane normal to said side panels during the mounting of a holder upon the mounting surface thereof; a mounting cam structure on the inner face of each mounting stud, and providing a cam surface inclined toward the interior of said frame as said surface extends toward the end of said stud; and a longitudinal positioning shoulder near the terminus of each of said cam surfaces, to longitudinally position said holder when said holder is disposed with the extreme ends of its mounting studs received in opposite mounting slots in front and back mounting flanges.

5. A frame for supporting circuit cards which includes: a pair of end panels; a pair of side panels attached to said end panels and adjustable laterally therein to provide a box structure of adjustable width; an inwardly extending mounting flange formed along the front edge of each of said side panels, the corner of said flange and said side panel being provided with a plurality of spaced openings forming 90° angle slots in said channel; an inwardly extending mounting flange along the back edge of each of said side panels, the corner of said flange and said side panel being provided with a plurality of spaced openings forming 90° angle slots in said channel; an inwardly extending mounting flange along the back edge of each of said side panels, the corner of said flange and said side panel being provided with a plurality of spaced 90° slots corresponding to said slots at said front edge flanges; a plurality of bar-shaped circuit card holders formed of insulating material adapted to be mounted against the inner mounting surface of said side panels, extending from front to back thereof, and slotted on the inner side to receive the edge of a circuit card; a mounting stud extending longitudinally of said reach of said holders at each end of each of said holders, each of said mounting studs being of reduced thickness transverse to said frame to permit flexure of said stud in a plane normal to said side panels during the mounting of a holder upon the mounting surface thereof; a longitudinal positioning shoulder spaced from the end of each of said insert studs to longitudinally position said holder when said holder is disposed with the extreme ends of its mounting studs received in opposite mounting slots in front and back mounting flanges.

6. A frame for supporting circuit cards which includes: a pair of end panels, each of said end panels having near its right and left sides a pair of lateral slots extending normally to the right and left edges of said end panels; a pair of side panels provided with end flanges attached to said end panels by means of said lateral slots therein, and adjustable laterally therein to provide a box structure of adjustable width; a mounting channel formed along the front edge of each of said side panels, each of said channels extending inwardly of its associated side panel and opening toward the back of said frame, the forward and outer edges of said channel being provided with a plurality of spaced openings forming 90° angle slots in the outer corner of said channel; an inwardly extending flange along the back edge of each of said side panels, the corner of said flange and said side panel being provided with a plurality of spaced 90° slots corresponding to said slots in said front edge channels; a plurality of circuit card holders formed of insulating material adapted to be mounted against the inner mounting surface of said side panels, extending from front to back thereof, and slotted on the inner side to receive the edge of a circuit card; a mounting stud extending longitudinally from each end of each of said holders, each of said mounting studs being of reduced thickness transverse to said frame to permit flexure of said stud in a plane normal to said side panels during the mounting of a holder upon the mounting surface thereof; a mounting cam structure on the inner face of each mounting stud, and providing a cam surface inclined toward the interior of said frame as said surface extends toward the end of said stud; and a longitudinal positioning shoulder near the terminus of each of said cam surfaces, to longitudinally position said holder when said holder is disposed with the extreme ends of its mounting studs received in opposite mounting slots in a front channel and a back flange of one of said side panels.

References Cited in the file of this patent

UNITED STATES PATENTS

| | | |
|---|---|---|
| 2,731,609 | Sobell | Jan. 17, 1956 |
| 2,880,379 | Stoddart | Mar. 31, 1959 |
| 2,894,077 | McCoy | July 7, 1959 |

FOREIGN PATENTS

| | | |
|---|---|---|
| 203,624 | Australia | Nov. 30, 1955 |